United States Patent
Nishiguchi et al.

(10) Patent No.: US 12,434,765 B2
(45) Date of Patent: Oct. 7, 2025

(54) ROTATION ANGLE DETECTION DEVICE FOR DETECTING STEERING ANGLE OF STEERING SHAFT OF VEHICLE WITH WHEELS

(71) Applicant: DENSO CORPORATION, Kariya (JP)

(72) Inventors: Yoshitaka Nishiguchi, Nisshin (JP); Ken Tanaka, Kariya (JP); Keisuke Uchida, Kariya (JP)

(73) Assignee: DENSO CORPORATION, Kariya (JP)

( * ) Notice: Subject to any disclaimer, the term of this patent is extended or adjusted under 35 U.S.C. 154(b) by 246 days.

(21) Appl. No.: 18/314,920

(22) Filed: May 10, 2023

(65) Prior Publication Data
US 2023/0278629 A1    Sep. 7, 2023

Related U.S. Application Data

(63) Continuation of application No. PCT/JP2021/038433, filed on Oct. 18, 2021.

(30) Foreign Application Priority Data

Nov. 16, 2020    (JP) .................. 2020-190049

(51) Int. Cl.
*B62D 15/02*    (2006.01)
*G01D 5/14*    (2006.01)

(52) U.S. Cl.
CPC ..... *B62D 15/0215* (2013.01); *B62D 15/0235* (2013.01); *G01D 5/145* (2013.01)

(58) Field of Classification Search
CPC .. B62D 15/0215; B62D 15/0235; B62D 6/10; G01D 5/145; G01D 2205/26; G01D 2205/28; G01B 7/30; G01L 3/10
See application file for complete search history.

(56) References Cited

U.S. PATENT DOCUMENTS

| | | | |
|---|---|---|---|
| 2003/0046012 A1 | 3/2003 | Yamaguchi | |
| 2014/0208890 A1 | 7/2014 | Takayanagi et al. | |
| 2015/0367881 A1* | 12/2015 | Tsunoda | G01L 5/221 701/43 |
| 2016/0362128 A1* | 12/2016 | Sugawara | G01B 21/22 |
| 2018/0372475 A1* | 12/2018 | Yoshiya | G01B 7/30 |
| 2019/0100234 A1* | 4/2019 | Kezobo | B60W 10/20 |
| 2019/0367093 A1* | 12/2019 | Suzuki | G01B 7/30 |
| 2021/0199520 A1* | 7/2021 | Knoll | B62D 3/12 |
| 2021/0245800 A1* | 8/2021 | Kitazume | B62D 5/0463 |

FOREIGN PATENT DOCUMENTS

JP    2007-232461 A    9/2007

* cited by examiner

*Primary Examiner* — Alvaro E Fortich
(74) *Attorney, Agent, or Firm* — Posz Law Group, PLC

(57) ABSTRACT

A rotation angle detection device includes a first detection unit, a second detection unit, and a calculation unit. The first detection unit detects a first rotation angle of a steering shaft that rotates with a steering wheel. The second detection unit detects a second rotation angle of a motor shaft coupled to the steering shaft via a speed reduction mechanism. The calculation unit receives the first rotation angle from the first detection unit and the second rotation angle from the second detection unit, and calculates the steering angle of the steering shaft based on a difference angle between the first rotation angle and the second rotation angle.

6 Claims, 11 Drawing Sheets

ROTATION ANGLE DETECTION DEVICE FOR DETECTING STEERING ANGLE OF STEERING SHAFT OF VEHICLE WITH WHEELS

CROSS REFERENCE TO RELATED APPLICATIONS

The present application is a continuation application of International Patent Application No. PCT/JP2021/038433 filed on Oct. 18, 2021, which designated the U.S. and claims the benefit of priority from Japanese Patent Application No. 2020-190049 filed on Nov. 16, 2020. The entire disclosures of all of the above applications are incorporated herein by reference.

TECHNICAL FIELD

The present disclosure relates to a rotation angle detection device.

BACKGROUND

A steering angle detection device detects a steering angle of a steering shaft of a vehicle. The steering angle detection device includes a vernier calculation unit, a neutral period specifying unit, and a neutral point specifying unit.

SUMMARY

According to an aspect of the present disclosure, a rotation angle detection device includes a first detection unit, a second detection unit, and a calculation unit. The first detection unit detects a first rotation angle of a steering shaft that rotates with a steering wheel. The second detection unit detects a second rotation angle of a motor shaft coupled to the steering shaft via a speed reduction mechanism. The calculation unit receives the first rotation angle from the first detection unit and the second rotation angle from the second detection unit, and calculates a steering angle of the steering shaft based on a difference angle between the first rotation angle and the second rotation angle.

DETAILED DESCRIPTION

Figure 1:
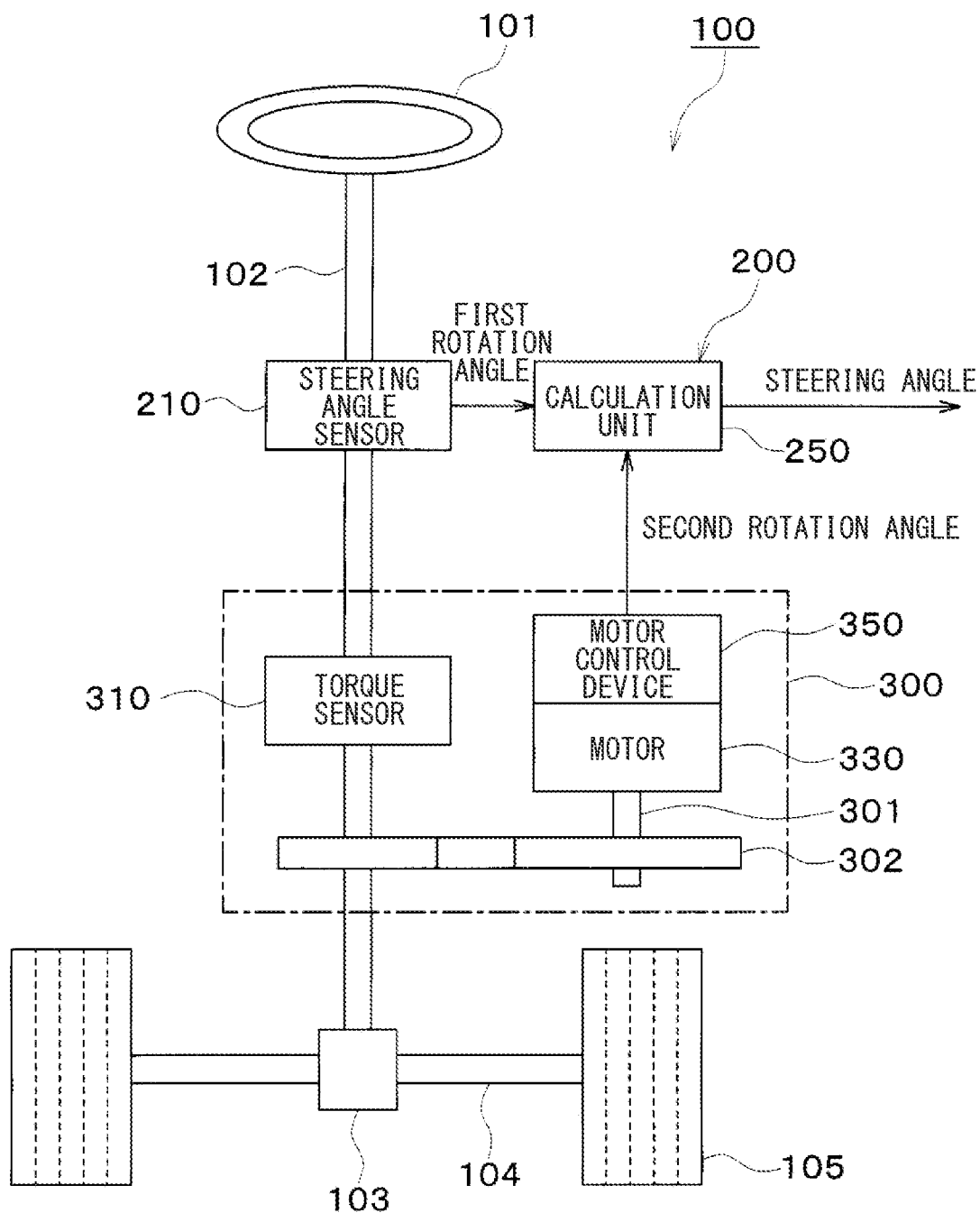
FIG. 1 is a diagram illustrating a steering system according to a first embodiment.

Conventionally, a steering angle detection device detects a steering angle of a steering shaft of a vehicle. The steering angle detection device includes a vernier calculation unit, a neutral period specifying unit, and a neutral point specifying unit.

The vernier calculation unit calculates a reference angle based on the motor angle and the steering shaft angle. The neutral period specifying unit inputs an estimated or measured self-aligning torque value. The neutral period specifying unit specifies a neutral period of the reference angle based on the self-aligning torque value.

The neutral point specifying unit inputs a value of the reference angle corresponding to a handle neutral point stored in advance as the neutral point value. The neutral point specifying unit receives an angle signal, in which the neutral period including the neutral point is specified, from the neutral period specifying unit. Then, the neutral point specifying unit acquires a steering angle based on the neutral point value and the angle signal.

However, in the above-described technique, the self-aligning torque value is required to acquire the steering angle. Therefore, a complicated estimation unit for estimating the self-aligning torque value and a measurement unit for measuring the self-aligning torque value are required in the steering angle detection device.

The present disclosure provides a rotation angle detection device capable of simplifying a calculation of the steering angle without requiring a self-aligning torque value.

According to an aspect of the present disclosure, a rotation angle detection device includes a first detection unit, a second detection unit, and a calculation unit.

The first detection unit detects a first rotation angle of a steering shaft that rotates in conjunction with a steering wheel. The second detection unit detects a second rotation angle of a motor shaft coupled to the steering shaft via a speed reduction mechanism.

The calculation unit receives the first rotation angle from the first detection unit and the second rotation angle from the second detection unit, and calculates the steering angle of the steering shaft based on the difference angle between the first rotation angle and the second rotation angle.

Accordingly, the steering angle of the steering shaft is calculated based on the difference angle between the first rotation angle of the steering shaft and the second rotation angle of the motor shaft. Therefore, it is possible to simplify the calculation of the steering angle of the steering shaft without requiring the self-aligning torque value.

Hereinafter, embodiments for implementing the present disclosure are described referring to drawings. In the embodiment, portions corresponding to those described in the preceding embodiment are denoted by the same reference numerals, and overlapping descriptions may be omitted. In a case where only a part of a configuration is described in each embodiment, the other embodiments described above are capable of being applied for the other parts of the configuration. A combination of parts is possible when it is explicitly stated that the combination is possible in each embodiment. A partial combination of the embodiments is also possible even if it is not explicitly stated that the partial combination is possible, unless there is a particular problem with the partial combination.

First Embodiment

A first embodiment will be described with reference to the drawings. As illustrated in FIG. 1, a steering system 100 includes a steering wheel 101, a steering shaft 102, a pinion gear 103, a rack shaft 104, a wheel 105, a rotation angle detection device 200, and an electric power steering device 300.

The steering wheel 101 is a steering member operated by the driver. The steering shaft 102 rotates about the rotation axis in conjunction with the steering wheel 101. The pinion gear 103 converts the rotation of the steering shaft 102 into the movement of the rack shaft 104. The wheel 105 is connected to the rack shaft 104.

Figure 2:
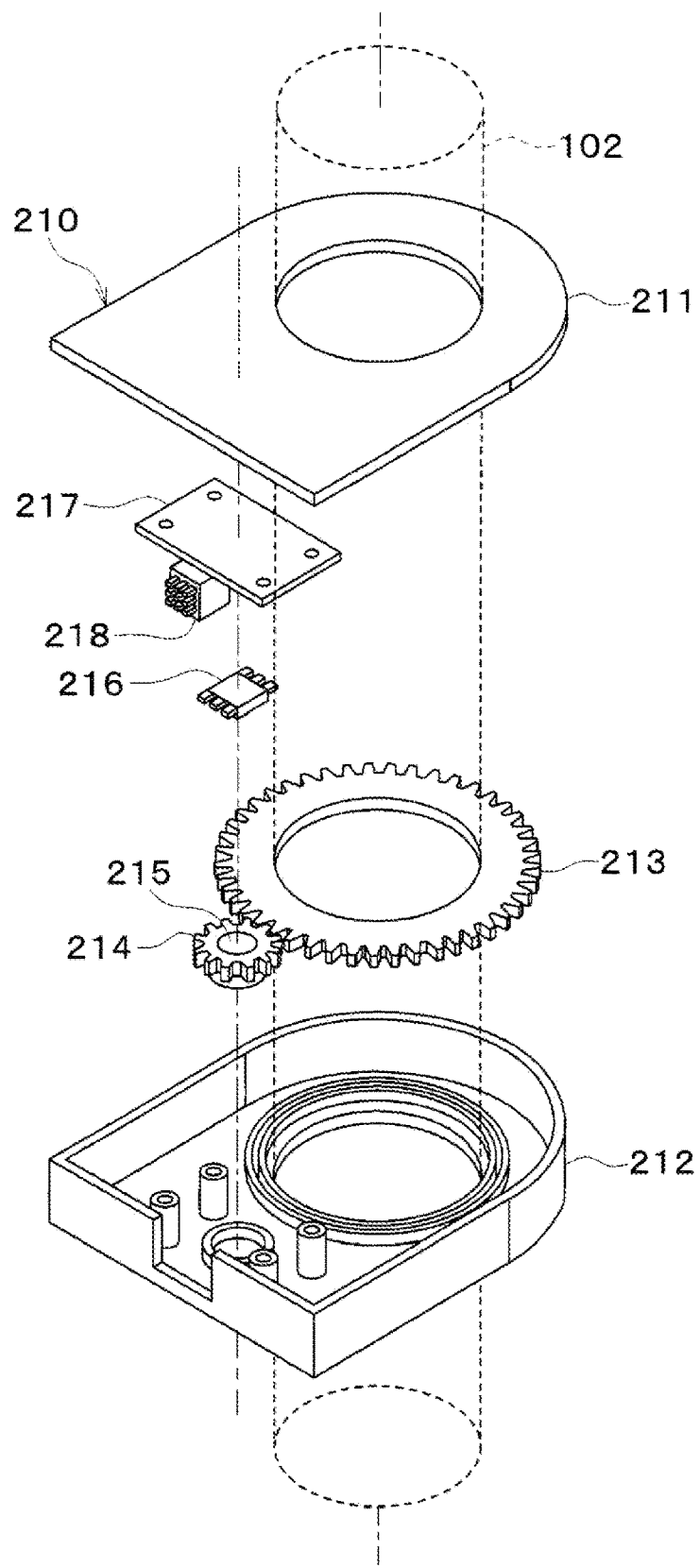
FIG. 2 is an exploded perspective view illustrating a steering angle sensor.
Figure 3:
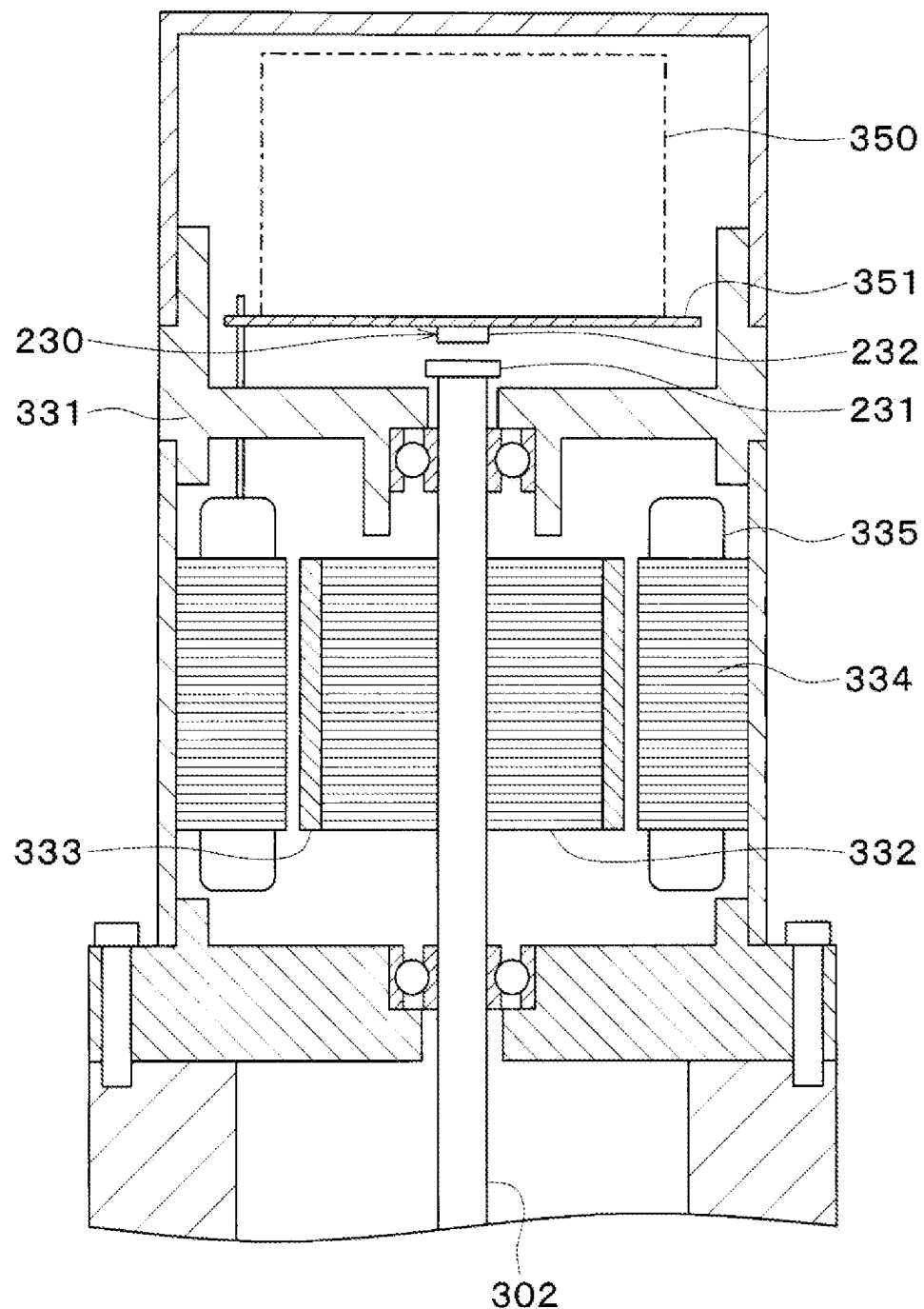
FIG. 3 is a sectional view showing a motor and a motor control device.

The rotation angle detection device 200 estimates the steering angle of the steering shaft 102. As illustrated in FIGS. 1 to 3, the rotation angle detection device 200 includes a steering angle sensor 210, a rotation angle sensor 230, and a calculation unit 250.

The electric power steering device 300 is a steering device that enables the driver to operate the steering wheel 101 with a light force. As illustrated in FIG. 1, the electric power steering device 300 rotates the motor shaft 301 in accordance with a command. Thus, the electric power steering device 300 applies torque to the steering shaft 102 via the speed reduction mechanism 302. The speed reduction mechanism 302 is a speed reduction gear that mechanically transmits rotation of the motor shaft 301 to the steering shaft 102.

The steering angle sensor 210 of the rotation angle detection device 200 detects a first rotation angle of the steering shaft 102. The first rotation angle is an absolute angle between 0° and 360°. As illustrated in FIG. 2, the steering angle sensor 210 includes a housing 211, 212, a driving gear 213, a driven gear 214, a magnet 215, a magnetic flux detector 216, a substrate 217, and a connector 218.

The housings 211 and 212 are combined with each other to house components such as the driving gear 213. The steering shaft 102 passes through the housing 211, 212, and the housing 211, 212 is fixed in position with respect to the steering shaft 102.

The driving gear 213 is fixed to the steering shaft 102 and rotates in conjunction with the steering shaft 102. The driven gear 214 meshes with the driving gear 213 and rotates in conjunction with the driving gear 213. The driven gear 214 is disposed in a recess of the housing 212.

The magnet 215 is a two-pole magnet including N pole and S pole magnetized in the radial direction of the steering shaft 102. The magnet 215 is fixed to the driven gear 214 and rotates together with the driven gear 214. The magnetic flux detector 216 detects the first rotation angle of the steering shaft 102 based on a change in magnetic flux received from the magnet 215.

The magnetic flux detector 216 is configured as a molded body including a Hall element and a magnetoresistive element. The magnetic flux detector 216 is mounted on the substrate 217. The magnetic detection is superior to the other angle detection means such as a potentiometer and a rotary encoder in terms of mass production such as cost, size, and durability.

The substrate 217 is, for example, a printed circuit board. The connector 218 is connected to a wiring for outputting the detection result of the magnetic flux detector 216 to the calculation unit 250.

The rotation angle sensor 230 is housed in the electric power steering device 300. The rotation angle sensor 230 detects a second rotation angle of the motor shaft 301. The second rotation angle is an absolute angle between 0° and 360°. The rotation angle sensor 230 is configured as, for example, the above-described magnetic sensor or a resolver.

The calculation unit 250 receives information of the first rotation angle from the steering angle sensor 210 and receives information of the second rotation angle from the rotation angle sensor 230 in the electric power steering device 300. The calculation unit 250 calculates the steering angle of the steering shaft 102 based on the difference angle between the first rotation angle and the second rotation angle. The calculation unit 250 is housed in the steering angle sensor 210 or the electric power steering device 300. Alternatively, the calculation unit 250 is independently mounted on the vehicle.

As illustrated in FIGS. 1 and 3, the electric power steering device 300 includes a torque sensor 310, a motor 330, and a motor control device 350 in addition to the speed reduction mechanism 302. The torque sensor 310 detects a steering torque input by the driver operating the steering wheel 101. The torque sensor 310 is provided on the steering shaft 102.

The motor 330 is configured as a brushless electric power steering (EPS) motor. As shown in FIG. 3, the motor 330 includes a housing 331, a motor shaft 301, a rotor 332, a magnet 333, a stator 334, and a winding 335.

The motor shaft 301 is provided in the housing 331 so as to be rotatable about a rotation axis. The motor shaft 301 is supported by a bearing provided in the housing 331. The motor shaft 301 is coupled to the speed reduction mechanism 302. The rotor 332 is fixed to the motor shaft 301. The magnet 333 is provided on the rotor 332. The stator 334 is fixed to the housing 331, and the winding 335 is wound around the stator 334.

The motor control device 350 is housed in the housing 331 of the motor 330. The motor control device 350 includes a substrate 351. An electronic component (not shown) for controlling the motor 330 are mounted on the substrate 351. The motor control device 350 controls the motor 330 based on the second rotation angle detected by the rotation angle sensor 230.

The rotation angle sensor 230 includes the magnet 231 and the magnetic flux detector 232. The magnet 231 is fixed to an end surface of the motor shaft 301. The magnet 231 is a two-pole magnet including N pole and S pole magnetized in the radial direction of the motor shaft 301. The magnetic flux detector 232 is mounted on the substrate 351 so as to face the magnet 231. The rotation angle sensor 230 is used in both the rotation angle detection device 200 and the electric power steering device 300.

Next, the principle of detecting the steering angle of the steering shaft 102 will be described. The steering angle sensor 210 detects a first rotation angle of the steering shaft 102. The rotation angle sensor 230 detects a second rotation angle of the motor shaft 301.

Figure 4:
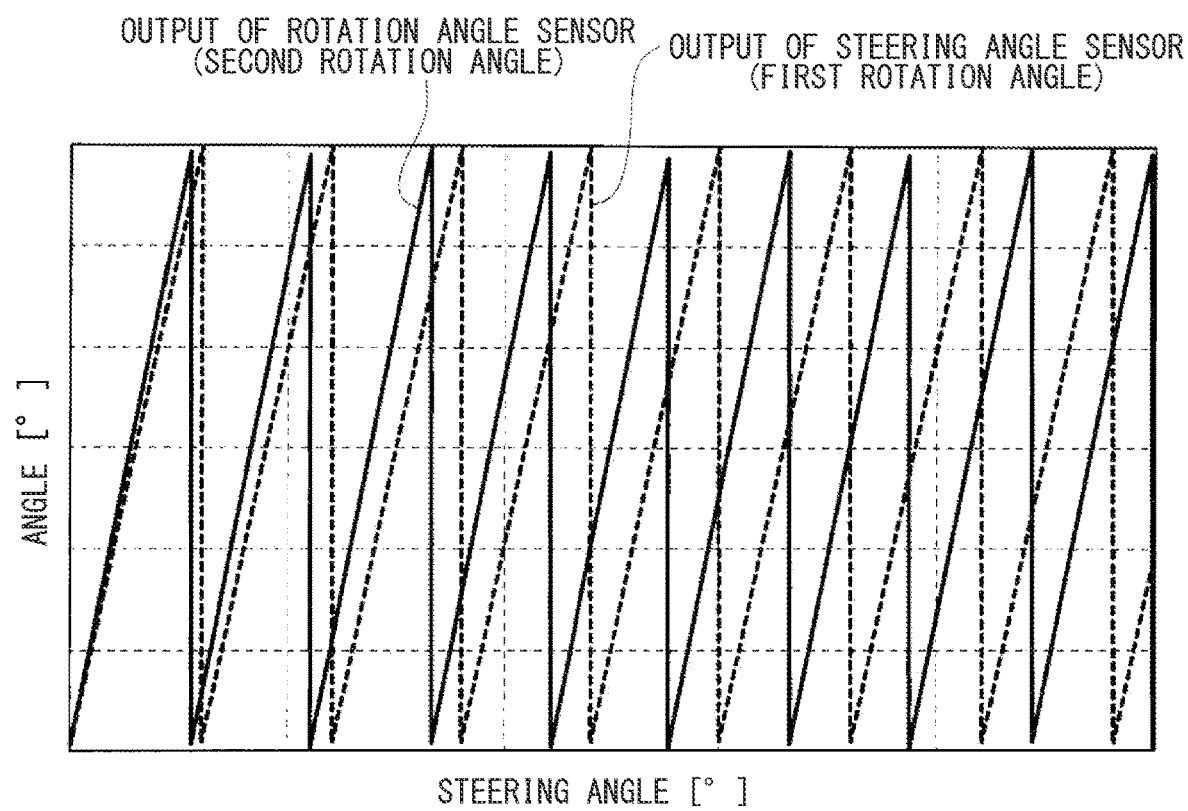
FIG. 4 is a diagram illustrating an output of a steering angle sensor and an output of a rotation angle sensor.
Figure 5:
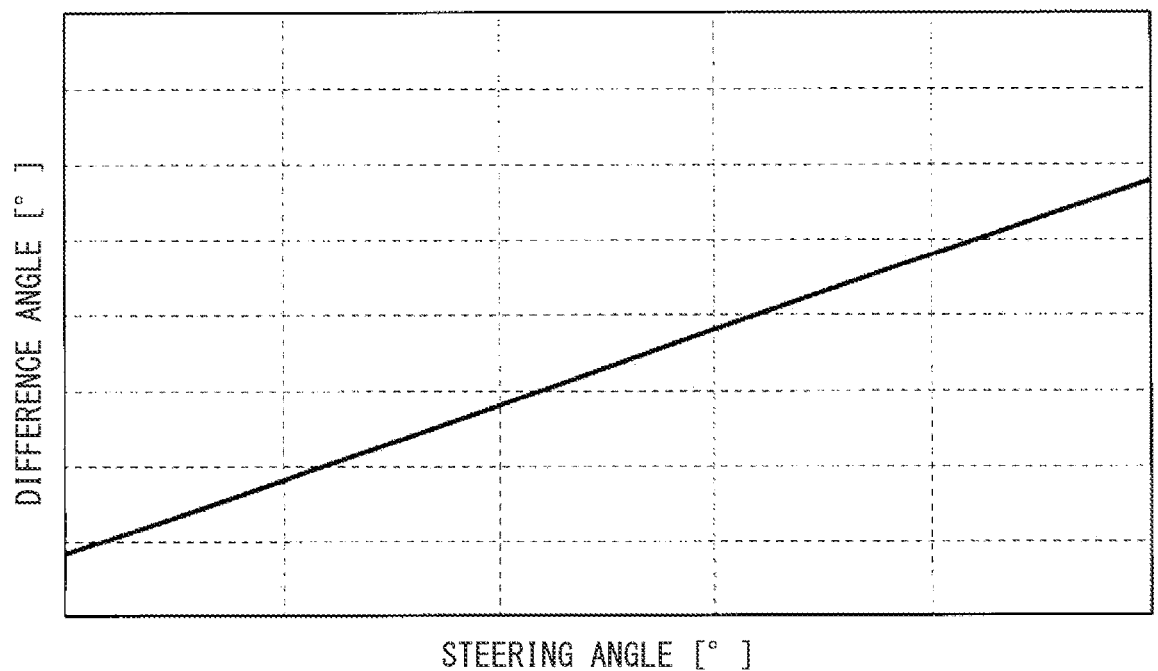
FIG. 5 is a diagram illustrating a relationship between a steering angle and a difference angle between a first rotation angle and a second rotation angle.

As illustrated in FIG. 4, during one rotation of the steering shaft 102, the first rotation angle that is the output of the steering angle sensor 210 and the second rotation angle that is the output of the rotation angle sensor 230 are different from each other. Then, the calculation unit 250 performs a vernier calculation. That is, the calculation unit 250 calculates the difference angle between the first rotation angle and the second rotation angle. As shown in FIG. 5, the steering angle with respect to the difference angle is obtained. Therefore, the calculation unit 250 can estimate the steering angle from the difference angle between the first rotation angle and the second rotation angle.

In order to uniquely specify the steering angle within an arbitrary steering angle range, the difference angle within the arbitrary steering angle range may be set to an angle smaller than an angle that can be detected by the steering angle sensor 210 or the magnetic flux detector 216.

Specifically, the first reduction ratio of the speed reduction mechanism 302 between the steering shaft 102 and the motor shaft 301 is defined as $Z_{EPS}$. The second reduction ratio between the driving gear 213 and the driven gear 214 is defined as $Z_{angle}$. The reduction ratio is a gear ratio.

An angle range of the steering angle acquired by the calculation unit 250 is defined as θ. For example, when the steering wheel 101 rotates from −500° to +500°, the angle range θ of the steering angle is 1000°. The angle range θ of the steering angle may be set to 2000°.

The first reduction ratio $Z_{EPS}$, the second reduction ratio $Z_{angle}$, and the angle range θ of the steering angle are set so as to satisfy the following:

$|(Z_{EPS}-Z_{angle})\times\theta|<360°$ or $|(Z_{EPS}-Z_{angle})\times\theta|<180°$. Accordingly, the calculation unit 250 can easily and uniquely specify the steering angle by the vernier calculation.

The reason why the condition is divided between 360° and 180° is that it depends on the detection element employed in the magnetic flux detector 216, 232. When, for example, GMR (Giant Magneto Resistance) or TMR (Tunneling Magneto Resistance) is employed as the detection element of the magnetic flux detector 216, 232, a condition of less than 360° is applied. When AMR (Anisotropic Magneto Resistance) is employed as the detection element of the magnetic flux detector 216, 232, a condition of less than 180° is applied.

As described above, in the present embodiment, the steering angle of the steering shaft 102 is calculated based on the difference angle between the first rotation angle of the steering shaft 102 and the second rotation angle of the motor shaft 301. Therefore, the self-aligning torque value is unnecessary. Further, a complicated estimation unit for estimating the self-aligning torque value and a measurement unit for measuring the self-aligning torque value are not required. Therefore, the steering angle of the steering shaft 102 can be simply calculated.

The steering angle sensor 210 can be configured to include the driving gear 213, the driven gear 214, the magnet 215, and the magnetic flux detector 216. Therefore, it is possible to significantly reduce the cost and size of the steering angle sensor 210 and the rotation angle detection device 200.

The steering angle sensor 210 of the present embodiment corresponds to a first detection unit, and the rotation angle sensor 230 corresponds to a second detection unit.

Second Embodiment

In the present embodiment, the configurations different from those of the first embodiment will be mainly described.

Generally, the first reduction ratio $Z_{EPS}$ of the speed reduction mechanism 302 is about 13 to 20:1, depending on the vehicle type. In contrast, due to the limitation of the physical size of the steering angle sensor 210, the second reduction ratio $Z_{angle}$ between the driving gear 213 and the driven gear 214 is a realistic value of about 2 to 4:1. Therefore, when the two-pole magnet 215 is employed for the steering angle sensor 210, the difference between the gear ratio of the electric power steering device 300 and the gear ratio of the steering angle sensor 210 increases. There is a possibility that a sufficient range for detecting the steering angle cannot be secured.

Figure 6:
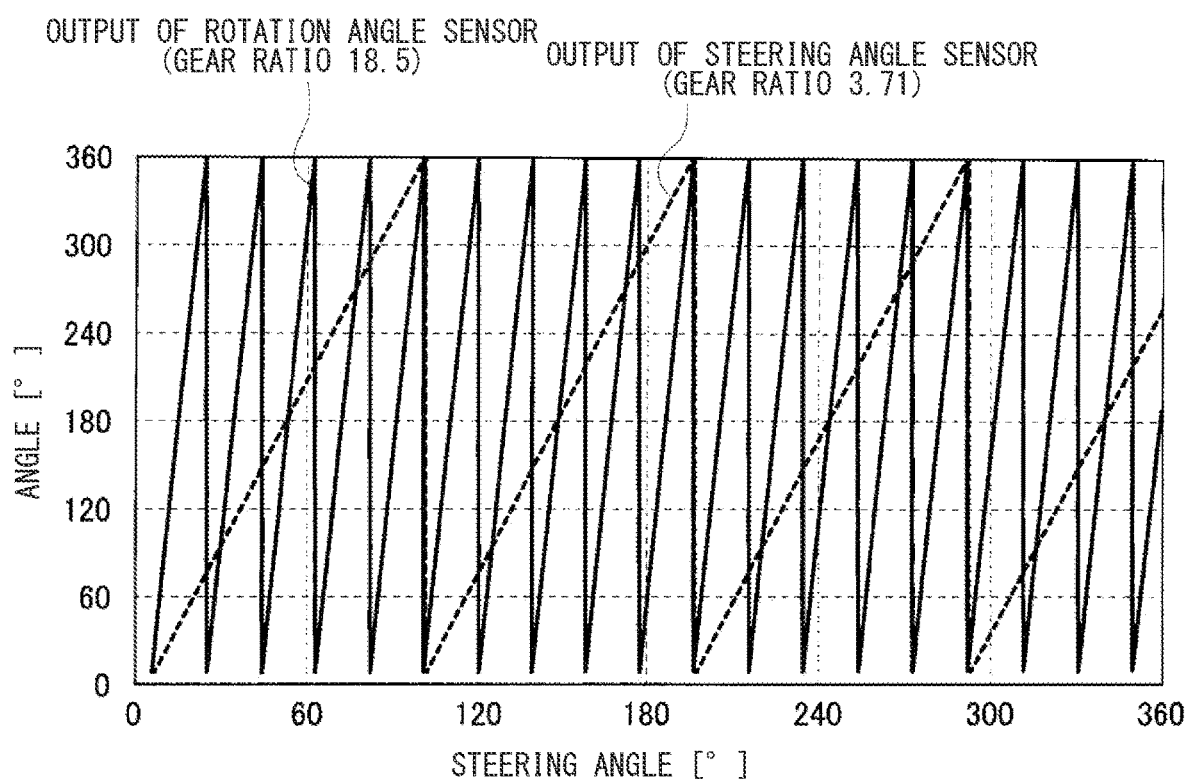
FIG. 6 is a diagram illustrating a case where an output of the steering angle sensor and an output of the rotation angle sensor are significantly different from each other in a second embodiment.
Figure 7:
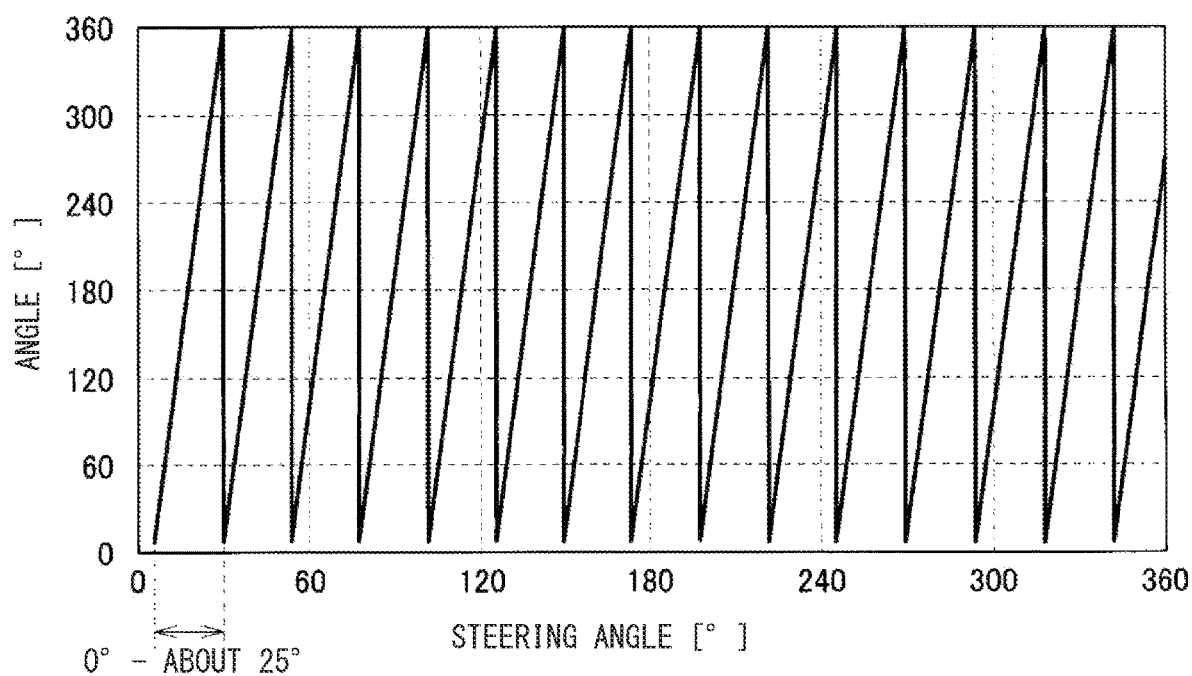
FIG. 7 is a diagram illustrating a relationship between a steering angle and a difference angle in each rotation angle illustrated in FIG. 6.

For example, it is assumed that the first reduction ratio $Z_{EPS}$ of the speed reduction mechanism 302 of the electric power steering device 300 is 18.5. In addition, the second reduction ratio $Z_{angle}$ between the driving gear 213 and the driven gear 214 is assumed to be 78:21=3.71. In this case, as shown in FIG. 6, the first rotation angle of the steering shaft 102 and the second rotation angle of the motor shaft 301 are greatly different from each other during one rotation of the steering shaft 102. As shown in FIG. 7, when the steering angle is calculated by the vernier calculation, the steering angle is uniquely determined only in a range from 0° to about 25°.

Figure 8:
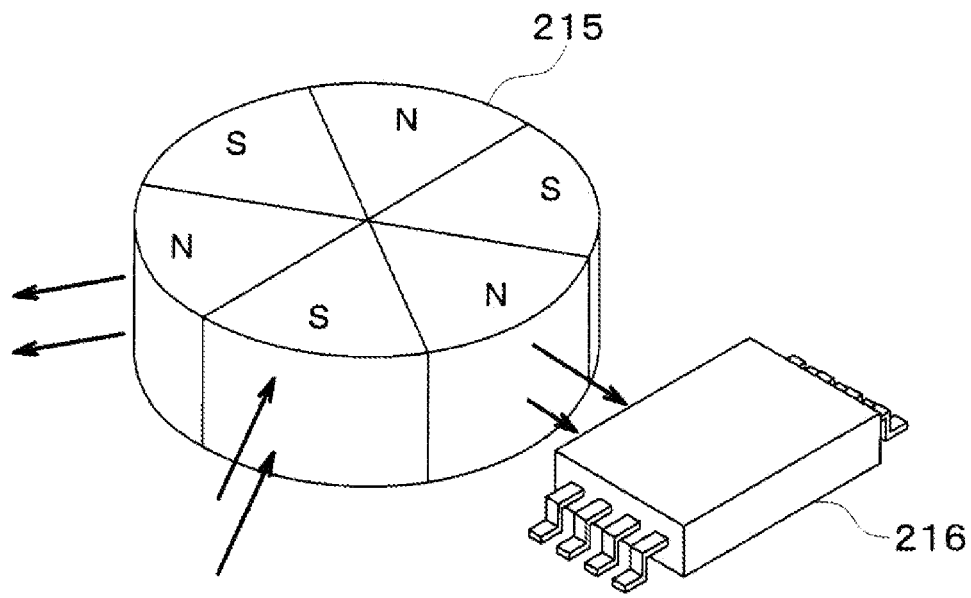
FIG. 8 is a perspective view illustrating a magnet of a steering angle sensor according to the second embodiment.

In the present embodiment, as illustrated in FIG. 8, the magnet 215 of the steering angle sensor 210 is configured as a multipole magnet. As a result, the magnet 215 generates a change in magnetic flux in a plurality of cycles during one rotation of the driven gear 214. The magnetic flux detector 216 is disposed to face the side surface of the magnet 215.

In order to uniquely specify the steering angle within an arbitrary steering angle range, the number of pole pairs of the magnet 215 is defined as $P_{angle}$. The number of pole pairs is the number of pairs of N pole and S pole. In the magnet 215 shown in FIG. 8, the number of pole pairs is 3. The number of pole pairs may be at least two or more.

Therefore, the first reduction ratio $Z_{EPS}$, the second reduction ratio $Z_{angle}$, the number of pole pairs $P_{angle}$, and the angle range θ of the steering angle are set so as to satisfy the following:

$|(Z_{EPS}-Z_{angle}\times P_{angle})\times\theta|<360°$ or $|(Z_{EPS}-Z_{angle}\times P_{angle})\times\theta|<180°$.

The value of $(Z_{EPS}-Z_{angle}\times P_{angle})$ can be reduced by satisfying the above conditions. That is, the difference between the rotation period of the steering shaft 102 and the rotation period of the motor shaft 301 can be reduced. Therefore, a sufficient range can be secured for detecting the steering angle.

Third Embodiment

In the present embodiment, the description primarily focuses on the portions that differ from the first and second embodiments. In recent years, the detection range of the steering angle of the steering shaft 102 has tended to expand. In a general vehicle, the number of rotations of the steering wheel 101 is about 3. However, there is also a need to detect six or more rotations. In the second embodiment, the range in which the steering angle can be detected is expanded by making the magnet 215 multipolar, but there is a physical limit to increasing the number of magnetic poles of the magnet 215.

Figure 9:
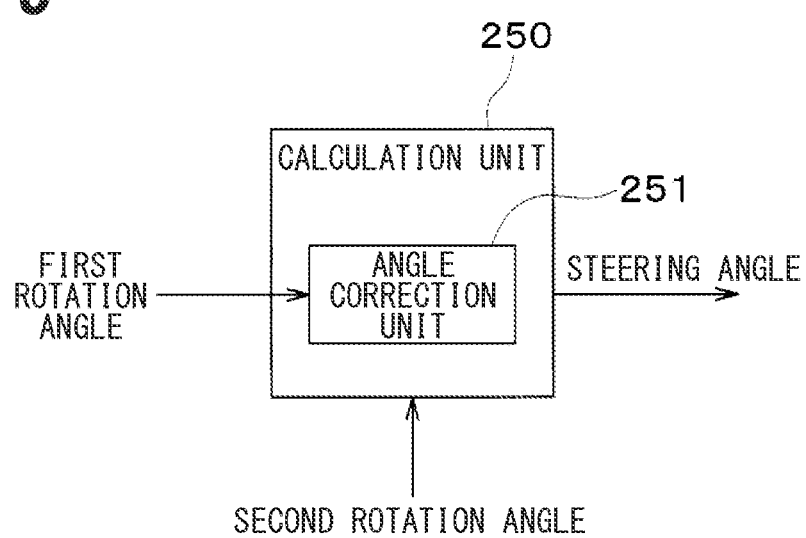
FIG. 9 is a diagram illustrating a calculation unit according to a third embodiment.

In the present embodiment, the detection range of the steering angle is expanded by the calculation using a software under the constraint of the physique. Specifically, as illustrated in FIG. 9, the calculation unit 250 includes an angle correction unit 251. The angle correction unit 251 multiplies the angle period of the first rotation angle by an integer. Thus, the gear ratio can be virtually increased by multiplying the output of the steering angle sensor 210 by an integer.

For example, assuming that the second reduction ratio $Z_{angle}$ between the driving gear 213 and the driven gear 214 is about 3.71, a change of 3.71 cycles occurs during one rotation of the steering wheel 101. In this embodiment, as an integer multiple, for example, the period is multiplied by 5. As described above, a virtual gear ratio obtained by multiplying the second reduction ratio $Z_{angle}$ between the driving gear 213 and the driven gear 214 by an integer is defined as N.

Therefore, the first reduction ratio $Z_{EPS}$, the second reduction ratio $Z_{angle}$, the virtual gear ratio N, and the angle range θ of the steering angle are set so as to satisfy the following:

$$|(Z_{EPS}-Z_{angle} \times N) \times \theta| < 360°$$

or $$|(Z_{EPS}-Z_{angle} \times N) \times \theta| < 180°.$$

Figure 10:
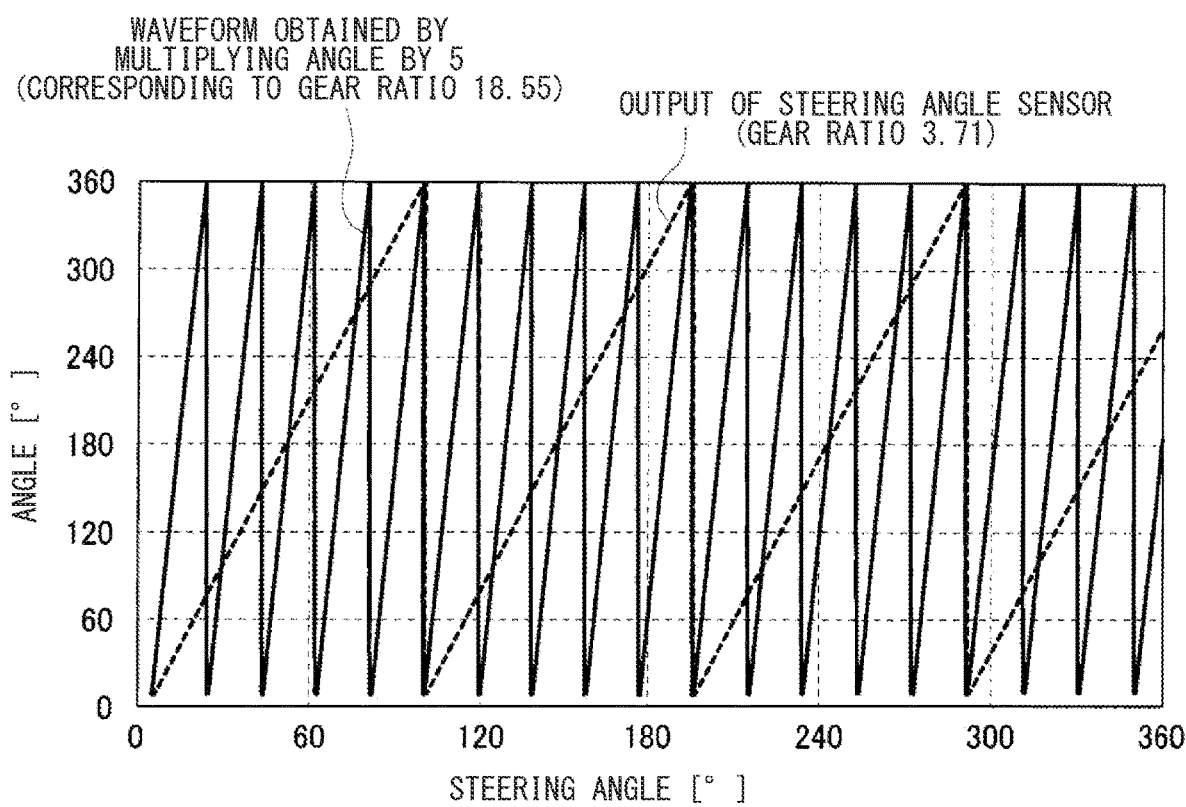
FIG. 10 is a diagram showing a case where the output of the steering angle sensor is multiplied by 5.

When the virtual gear ratio N is set to 5 times, the output of the steering angle sensor 210 is multiplied by 5 times. Accordingly, as shown in FIG. 10, the output of the steering angle sensor 210 is corrected to an angle waveform corresponding to the gear ratio of 18.55.

Figure 11:
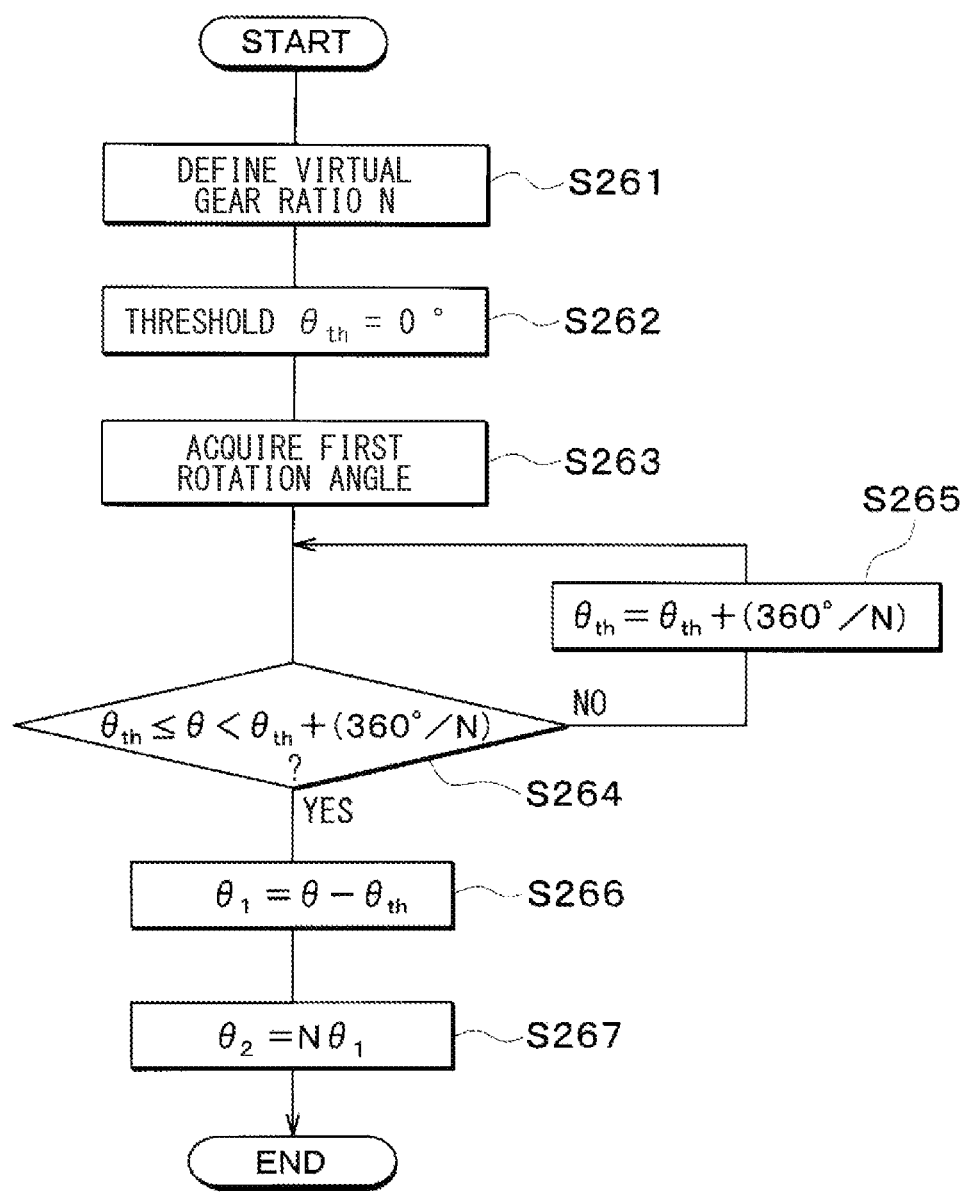
FIG. 11 is a flowchart showing an angle correction process by the calculation unit.

Specifically, as illustrated in FIG. 11, an angle correction process is performed. The angle correction process is executed by the calculation unit 250. Further, the virtual gear ratio N is set to three times.

First, in S261, a virtual gear ratio N is defined. For example, N=3. Subsequently, in S262, the threshold value θth is set to 0°. In S263, the first rotation angle that is the output of the steering angle sensor 210 is acquired. For example, the first rotation angle is θ=125°.

Subsequently, in S264, it is determined whether the first rotation angle satisfies the condition of θth≤θ≤θth+(360°/N). Since N=3 and θth=0°, it is determined whether the condition of 0°<θ<120° is satisfied. Since θ=125°, the condition of S264 is not satisfied. Therefore, the process proceeds to S265.

In S265, the threshold value θth is reset to the threshold value θth=θth+(360°/N). Since N=3 and θth=0°, θth=0°+(360°/3)=120°. Thereafter, the process returns to S264.

In S264, it is determined whether the condition is satisfied according to the reset threshold θth. Since the threshold value is reset to θth=120°, θ=125° satisfies the condition of 120°<θ<240°. Therefore, the process proceeds to S266. When the condition of S264 is not satisfied, S265 and S264 are repeated.

Figure 12:
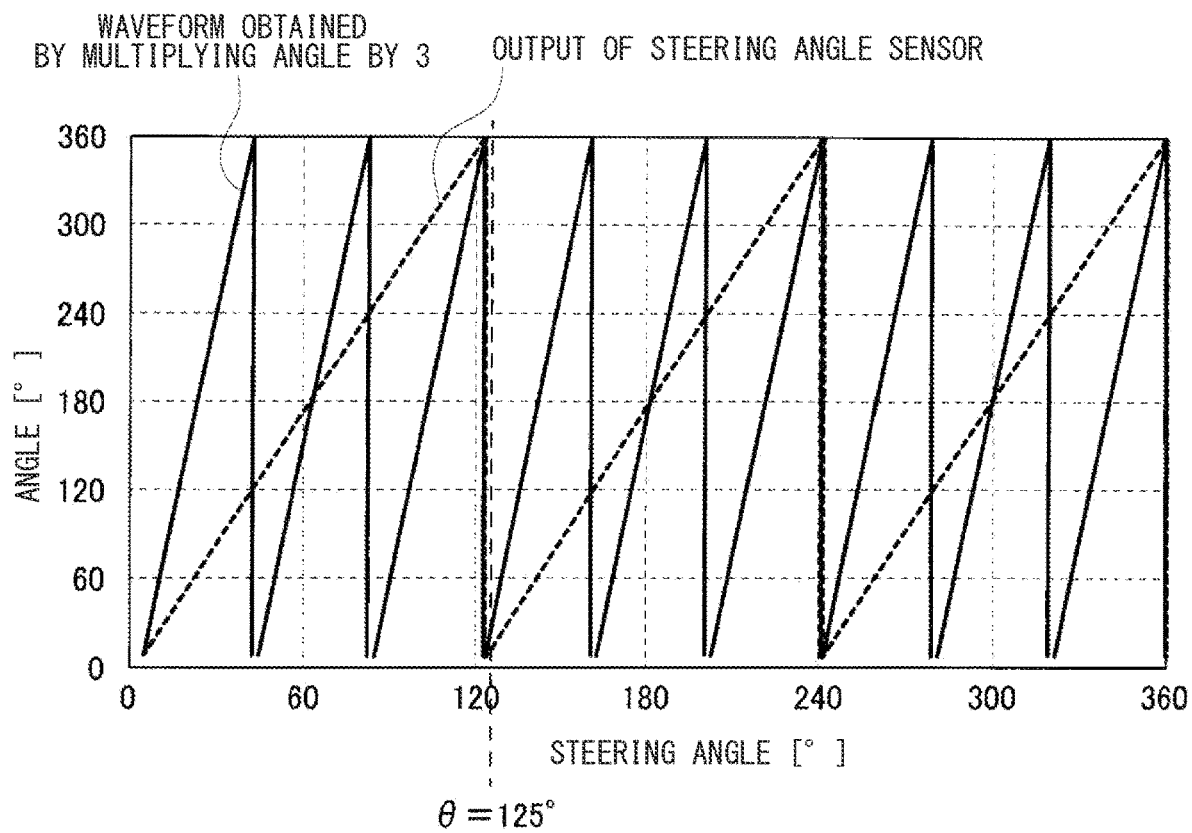
FIG. 12 is a diagram illustrating an angle waveform obtained by multiplying with an integer in the angle correction process.

In S266, θ1=θ−θth is obtained. Since θ=125° and the threshold value θth=120°, θ1=5°. In S267, θ2=N×θ1 is obtained. Since N=3 and θ1=5°, θ2=15°. That is, the first rotation angle of 125° is corrected to 15°. In this way, the angle correction process ends. Accordingly, as shown in FIG. 12, the first rotation angle of 125° of the steering angle sensor 210 is corrected to an angle waveform obtained by multiplying the rotation angle by 3.

Figure 13:
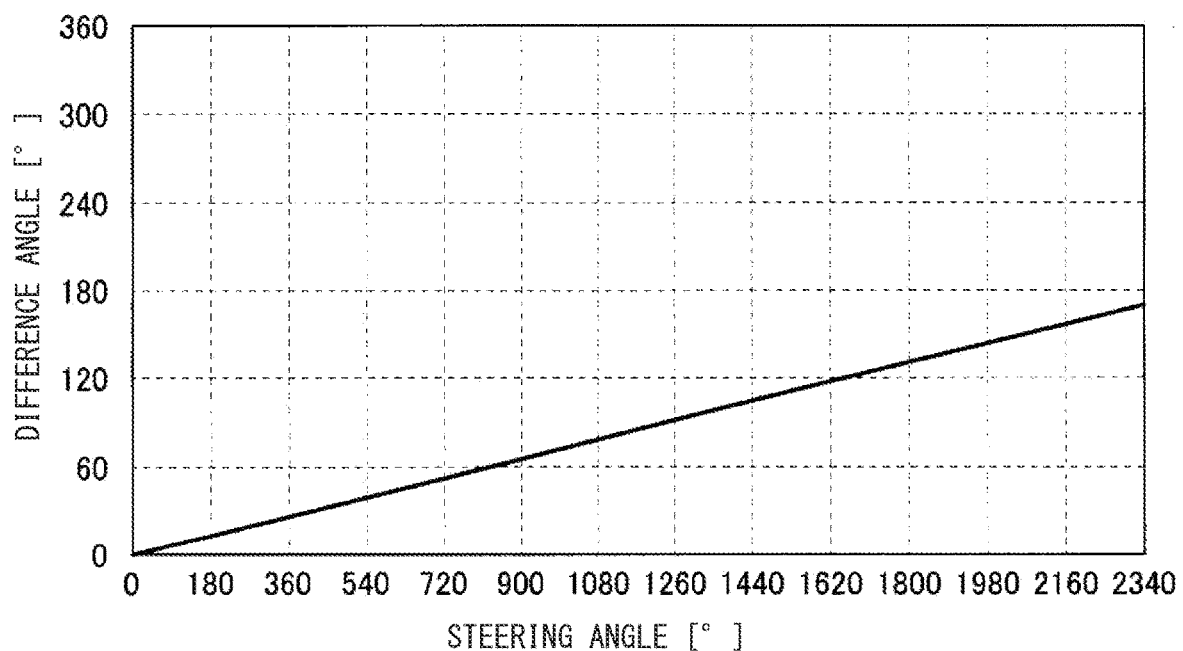
FIG. 13 is a diagram illustrating a relationship between a difference angle and an enlarged detection range of a steering angle.

Since the gear ratio between the driving gear 213 and the driven gear 214 of the steering angle sensor 210 can be virtually increased by the angle correction process, the value of ($Z_{EPS}-Z_{angle} \times$ N) decreases. Therefore, as shown in FIG. 13, the steering angle detection range can be expanded to 2000° or more. The virtual gear ratio N may be appropriately set within an integer range according to the steering angle detection range.

As a modification, the magnet 215 may have multiple poles. In this case, the first reduction ratio $Z_{EPS}$, the second reduction ratio $Z_{angle}$, the number of pole pairs $P_{angle}$, the virtual gear ratio N, and the angle range θ of the steering angle are set so as to satisfy the following:

$$|(Z_{EPS}-Z_{angle} \times P_{angle} \times N) \times \theta| < 360°$$

or $$|(Z_{EPS}-Z_{angle} \times P_{angle} \times N) \times \theta| < 180°.$$

Fourth Embodiment

In the present embodiment, the description primarily focuses on the portions that differ from the above embodiments. In the present embodiment, the first rotation angle is detected using the torque sensor 310 that detects the rotation torque of the steering shaft 102.

Figure 14:
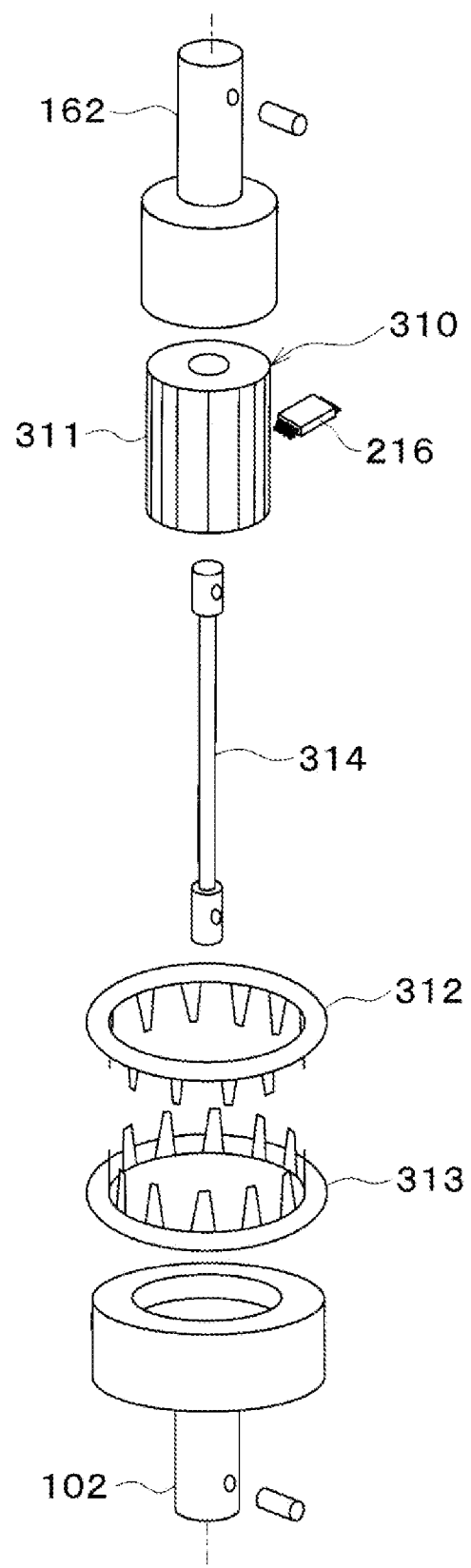
FIG. 14 is an exploded perspective view of a torque sensor according to the third embodiment.
Figure 15:
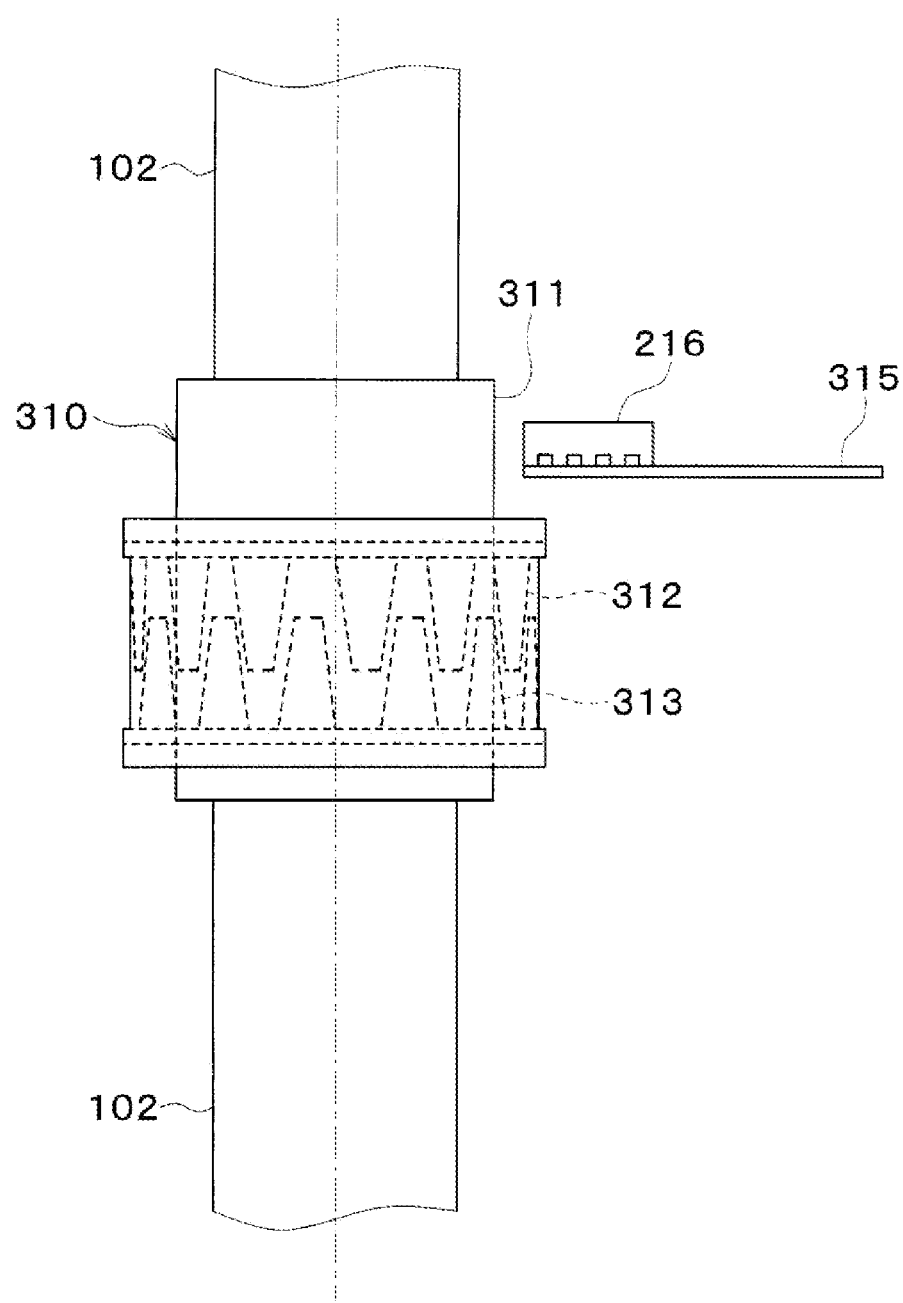
FIG. 15 is a side view of a torque sensor according to the third embodiment.

As illustrated in FIGS. 14 and 15, the torque sensor 310 includes a magnet 311, a yoke 312, 313, a torsion bar 314, and a substrate 315. The magnet 311 has a cylindrical shape. The magnet 311 is, for example, a multipole magnet having 16 poles or 24 poles. The magnet 311 rotates together with the steering shaft 102.

The yoke 312, 313 is a magnetic component for forming a magnetic path. Each of the yokes 312, 313 has a cylindrical portion provided with plural protrusions. The protrusions of the yokes 312, 313 are combined to mesh with each other, and the magnet 311 passes through the hollow portion of the cylindrical portion.

The torsion bar 314 is a component that is twisted as the steering shaft 102 rotates. The torsion bar 314 passes through the hollow portion of the magnet 311, and both end portions thereof are fixed to the steering shaft 102.

Electronic components such as the magnetic flux detector 216 are mounted on the substrate 315. The magnetic flux detector 216 is disposed to face the side surface of the magnet 311. The magnetic flux detector 216 detects the magnetic balance of each yoke 312, 313, which changes according to the torsion of the torsion bar 314, as a change in the magnetic flux received from the magnet 311. Accordingly, the magnetic flux detector 216 acquires the first rotation angle of the steering shaft 102. Note that a dedicated element for detecting the magnetic balance may be mounted on the substrate 315.

The calculation unit 250 calculates the steering angle of the steering shaft 102 based on the difference angle between the first rotation angle of the magnetic flux detector 216 of the torque sensor 310 and the second rotation angle of the rotation angle sensor 230.

Accordingly, since the rotation angle of the steering shaft 102 can be detected using the magnet 311 of the torque sensor 310, components such as the driving gear 213 are not required as the steering angle sensor 210. Therefore, the steering angle sensor 210 can be expected to be significantly reduced in size and cost. Since a gear component is not used for detecting the steering angle of the steering shaft 102, accuracy for detecting the steering angle detection can be improved.

Since the magnet 311 of the torque sensor 310 is a multipole magnet, the steering angle detection range can be expanded as described above. Further, the range in which the steering angle can be detected can be expanded by considering the virtual gear ratio N as in the third embodiment.

The present disclosure is not limited to the embodiments described above, and can be variously modified as follows without departing from the gist of the present disclosure.

For example, the method of detecting the steering angle described in each of the embodiments is an example. Instead of associating the difference angle with the steering angle one-to-one, a method may be employed in which the number of rotations of the driving gear 213, the driven gear 214, or the motor 330 is calculated from the difference angle, and the steering angle is calculated from the absolute angle calculated based on the number of rotations.

Numerical values of the first reduction ratio $Z_{EPS}$, the second reduction ratio $Z_{angle}$, the angle range θ of the steering angle, the number of pole pairs $P_{angle}$, the virtual gear ratio N, and the like are examples. The other numerical values may be adopted.

Although the present disclosure has been described in accordance with the embodiments, it is understood that the present disclosure is not limited to the above embodiments or structures. The present disclosure encompasses various modifications and variations within the scope of equivalents. In addition, while the various elements are shown in various combinations and configurations, which are exemplary, other combinations and configurations, including more, less or only a single element, are also within the spirit and scope of the present disclosure.

Each of the calculation unit and the motor control device described in the present disclosure may be implemented by a special purpose computer which is configured with a memory and a processor programmed to execute one or more particular functions embodied in computer programs of the memory. Alternatively, each of the calculation unit and the motor control device may be realized by a dedicated computer configured as a processor with one or more dedicated hardware logic circuits. Alternatively, each of the calculation unit and the motor control device may be realized by one or more dedicated computer, which is configured as a combination of a processor and a memory, which are programmed to perform one or more functions, and a processor which is configured with one or more hardware logic circuits. The computer program may be stored in a computer-readable non-transitory tangible storage medium as an instruction executed by a computer.

What is claimed is:

1. A rotation angle detection device for a vehicle with wheels, the rotation angle detection device comprising:
a first detection unit configured to detect a first rotation angle of a steering shaft that rotates with a steering wheel for operating a steering angle of the wheels;
a second detection unit configured to detect a second rotation angle of a motor shaft coupled to the steering shaft via a speed reduction mechanism; and
a calculation unit configured to:
receive the first rotation angle from the first detection, unit;
receive the second rotation angle from the second detection, unit; and
calculate, without using a self-aligning torque value, a steering angle of the steering shaft based on a difference angle between the first rotation angle and the second rotation angle, wherein:
the first detection unit includes:
a driving gear that rotates with the steering shaft;
a driven gear meshing with the driving gear to rotate with the driving gear;
a magnet fixed on the driven gear to rotate with the driven gear; and
a magnetic flux detector configured to detect the first rotation angle of the steering shaft based on a change in magnetic flux received from the magnet,
a first reduction ratio of the speed reduction mechanism between the steering shaft and the motor shaft is defined as $Z_{EPS}$,
a second reduction ratio between the driving gear and the driven gear is defined as $Z_{angle}$,
an angle range of the steering angle acquired by the calculation unit is defined as θ, and
the first reduction ratio, the second reduction ratio, and the angle range of the steering angle are combined and set to satisfy $|(Z_{EPS}-Z_{angle}) \times \theta| < 360°$ or $|(Z_{EPS}-Z_{angle}) \times \theta| < 180°$.

2. A rotation angle detection device for a vehicle with wheels, the rotation angle detection device comprising:
a first detection unit configured to detect a first rotation angle of a steering shaft that rotates with a steering wheel for operating a steering angle of the wheels;
a second detection unit configured to detect a second rotation angle of a motor shaft coupled to the steering shaft via a speed reduction mechanism; and
a calculation unit configured to:
receive the first rotation angle from the first detection unit;
receive the second rotation angle from the second detection unit; and
calculate, without using a self-aligning torque value, a steering angle of the steering shaft based on a difference angle between the first rotation angle and the second rotation angle, wherein:
the first detection unit includes:
a driving gear that rotates with the steering shaft;
a driven gear meshing with the driving gear to rotate with the driving gear;
a magnet fixed on the driven gear to rotate with the driven gear; and
a magnetic flux detector configured to detect the first rotation angle of the steering shaft based on a change in magnetic flux received from the magnet,
a first reduction ratio of the speed reduction mechanism between the steering shaft and the motor shaft is defined as $Z_{EPS}$,
a second reduction ratio between the driving gear and the driven gear is defined as $Z_{angle}$,
a virtual gear ratio obtained by multiplying the second reduction ratio by an integer is defined as N,
an angle range of the steering angle acquired by the calculation unit is defined as θ, and
the first reduction ratio, the second reduction ratio, the virtual gear ratio, and the angle range of the steering angle are combined and set to satisfy $|(Z_{EPS}-Z_{angle}) \times \theta| < 360°$ or $|(Z_{EPS}-Z_{angle}) \times \theta| < 180°$.

3. A rotation angle detection device for a vehicle with wheels, the rotation angle detection device comprising:
a first detection unit configured to detect a first rotation angle of a steering shaft that rotates with a steering wheel for operating a steering angle of the wheels;

a second detection unit configured to detect a second rotation angle of a motor shaft coupled to the steering shaft via a speed reduction mechanism; and a calculation unit configured to:
- receive the first rotation angle from the first detection unit;
- receive the second rotation angle from the second detection unit; and
- calculate, without using a self-aligning torque value, a steering angle of the steering shaft based on a difference angle between the first rotation angle and the second rotation angle, wherein:

the first detection unit includes:
- a driving gear that rotates with the steering shaft;
- a driven gear meshing with the driving gear to rotate with the driving gear;
- a magnet fixed on the driven gear to rotate with the driven gear; and
- a magnetic flux detector configured to detect the first rotation angle of the steering shaft based on a change in magnetic flux received from the magnet, the magnet generates a change in magnetic flux for a plurality of cycles during one rotation of the driven gear, a first reduction ratio of the speed reduction mechanism between the steering shaft and the motor shaft is defined as $Z_{EPS}$, a second reduction ratio between the driving gear and the driven gear is defined as $Z_{angle}$, a number of pole pairs of the magnet is defined as $P_{angle}$, an angle range of the steering angle acquired by the calculation unit is defined as $\theta$, and the first reduction ratio, the second reduction ratio, the number of pole pairs, and the angle range of the steering angle are combined and set to satisfy $$|(Z_{EPS}-Z_{angle}) \times \theta| < 360°$$

or $$|(Z_{EPS}-Z_{angle}) \times \theta| < 180°.$$

4. A rotation angle detection device for a vehicle with wheels, the rotation angle detection device comprising:
- a first detection unit configured to detect a first rotation angle of a steering shaft that rotates with a steering wheel for operating a steering angle of the wheels;
- a second detection unit configured to detect a second rotation angle of a motor shaft coupled to the steering shaft via a speed reduction mechanism; and
- a calculation unit configured to:
  - receive the first rotation angle from the first detection unit;
  - receive the second rotation angle from the second detection unit; and
  - calculate, without using a self-aligning torque value, a steering angle of the steering shaft based on a difference angle between the first rotation angle and the second rotation angle, wherein:

the first detection unit includes:
- a driving gear that rotates with the steering shaft;
- a driven gear meshing with the driving gear to rotate with the driving gear;
- a magnet fixed on the driven gear to rotate with the driven gear; and
- a magnetic flux detector configured to detect the first rotation angle of the steering shaft based on a change in magnetic flux received from the magnet, the magnet generates a change in magnetic flux for a plurality of cycles during one rotation of the driven gear, a first reduction ratio of the speed reduction mechanism between the steering shaft and the motor shaft is defined as $Z_{EPS}$, a second reduction ratio between the driving gear and the driven gear is defined as $Z_{angle}$, a number of pole pairs of the magnet is defined as $P_{angle}$, a virtual gear ratio obtained by multiplying the second reduction ratio by an integer is defined as N, an angle range of the steering angle acquired by the calculation unit is defined as $\theta$, and the first reduction ratio, the second reduction ratio, the number of pole pairs, the virtual gear ratio, and the angle range of the steering angle are combined and set to satisfy $$|(Z_{EPS}-Z_{angle} \times P_{angle} \times N) \times \theta| < 360°$$

or $$|(Z_{EPS}-Z_{angle} \times P_{angle} \times N) \times \theta| < 180°.$$

5. The rotation angle detection device according to claim 1, wherein
the steering shaft includes a torque sensor that detects a rotational torque of the steering shaft,
the torque sensor includes a magnet that rotates with the steering shaft, and
the first detection unit includes a magnetic flux detector that detects the first rotation angle of the steering shaft based on a change in magnetic flux received from the magnet.

6. The rotation angle detection device according to claim 1, wherein
the calculation unit includes an angle correction unit configured to multiply an angle period of the first rotation angle by an integer.

* * * * *